May 21, 1946.  W. H. NEWELL  2,400,775
CONTROL MECHANISM
Filed May 21, 1937  3 Sheets-Sheet 1

INVENTOR
William H. Newell
BY
Victor D. Borst
HIS ATTORNEY

INVENTOR
William H. Newell
BY
HIS ATTORNEY

May 21, 1946.  W. H. NEWELL  2,400,775
CONTROL MECHANISM
Filed May 21, 1937  3 Sheets-Sheet 3
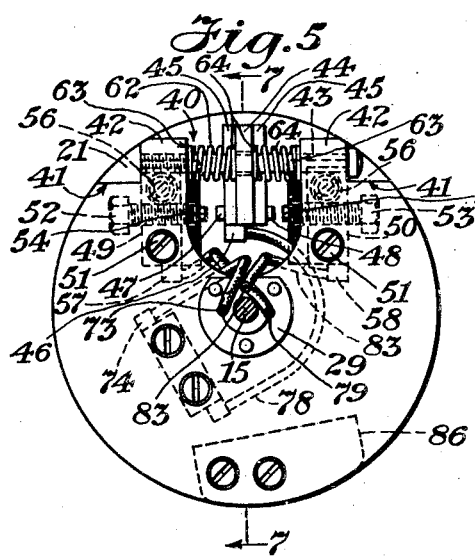
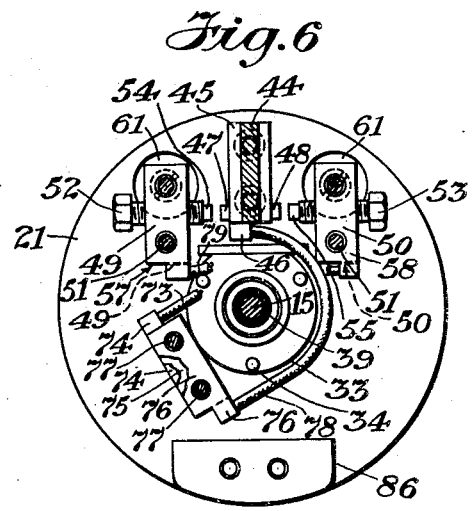
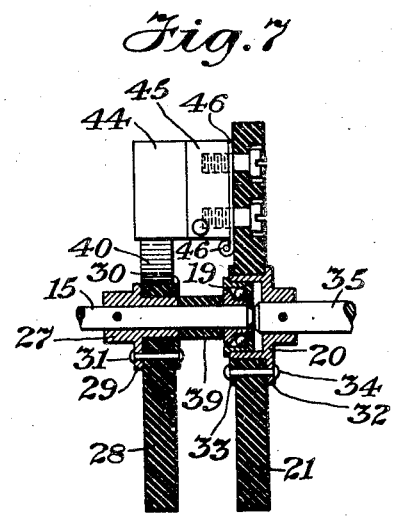
INVENTOR
William H. Newell
BY
HIS ATTORNEY Patented May 21, 1946

2,400,775

UNITED STATES PATENT OFFICE 2,400,775

CONTROL MECHANISM

William H. Newell, New York, N. Y., assignor to Ford Instrument Company, Inc., Long Island City, N. Y., a corporation of New York Application May 21, 1937, Serial No. 143,883

18 Claims. (Cl. 172—239)

The invention herein disclosed relates to a system for controlling changes in speed of a prime mover and more particularly the invention relates to a mechanism for smoothing out the motion of a variably energized prime mover having a maximum torque substantially greater than that requisite for driving a driven member.

In certain types of apparatus, it is common to drive the transmitter of an electrical transmission system or other device of low inertia by a follow-up motor controlled in accordance with the output of a calculating mechanism, the output of which is variable and sometimes oscillatory in character. When such oscillatory output is followed up, objectionable oscillation will result and it is therefore necessary to control the power output in some manner.

An object of this invention is to provide a system or mechanism by means of which the rate of change of speed of a variably energized prime mover is limited so that it is impossible to effect rapid changes in the speed of the prime mover or rapid oscillations of the prime mover.

In accordance with the invention, there is provided inertia for loading the prime mover and thus preventing rapid changes in the rate of the movement of the prime mover. Below certain accelerations of the prime mover, however, the prime mover is relieved of the inertia means. Specifically, this is accomplished by providing another prime mover to overcome and neutralize the inertia below predetermined changes in the speed of the controlled prime mover. When applied to controlling a variably energized electric motor, for example, there is provided another electric motor, the controlling motor, that has a maximum torque which is considerably greater than the effective torque of the controlled motor. The rotor of the controlling motor is combined with an inertia element for loading the controlled motor. The inertia of the controlling motor and the inertia element have a predetermined value related to the torques of the controlled and controlling motors. This relation is such that the sum of the maximum torques of the controlled and controlling motors when applied to the combined inertia of the inertia element and the rotor of the controlled motor, that changes in speed of the controlled motor and the element actuated thereby are limited to the maximum desirable rate of change of speed. The controlling motor is energized upon operation of the controlled motor so that the two motors operate together and their respective torques are additive as regards the inertia. To illustrate the manner in which this operation effects the actuation of the controlled motor, let it be assumed that the controlled motor has a given torque, $T$, effective at the inertia, and that normally only one-half of this torque is utilized. The small torque required by the driven element is neglected in this discussion. To the torque, $T$, is added the torque of the controlling motor which is, as stated, considerably larger than the torque of the controlled motor, say seven times greater. The smaller torque of the controlled motor cannot increase the torque of the controlling motor, but, as stated, is added to it. If only one-half of the torque of the controlled motor is being utilized, we then have a combined torque of the controlled and controlling motors equal to $$\tfrac{1}{2}T + 7T$$

Since the combined torque $$(\tfrac{1}{2}T + 7T)$$

equals the product of the inertia, $I$, of the inertia device and the rotor of the controlling motor, and the acceleration, $a$, of the controlled motor, we have the relation (1) $\qquad (\tfrac{1}{2}T + 7T) = Ia$ for the operation of the control of the system where only one-half of the torque of the controlled motor is utilized.

If now it be assumed that the controlled motor is fully energized so that the entire available torque is applied to its rotor and thus to the element driven thereby, which condition may develop as the result of oscillations or in a follow-up motor being materially out of agreement with the controlling mechanism, there is then the full torque of the controlled motor added to the greater torque of the controlling motor or $$T + 7T$$

There then exists the relation of (2) $\qquad (T + 7T) = Ia$ in which $a$ is the resultant increased acceleration that is, however, substantially negligible in comparison to the maximum rate of change of speed that the controlled motor might assume without the controlling inertia.

If Formulae 1 and 2 above are now compared it will be seen that (1) $\qquad (\tfrac{1}{2}T + 7T) = Ia$ and (2) $\qquad (T + 7T) = Ia$ With this arrangement, the greater rate of change of speed of the controlled motor may be limited to any desirable maximum by properly correlating the inertia to the torques of the controlled and controlling motors and the torque of the controlling motor with respect to the effective torque of the controlled motor.

A system for thus controlling the acceleration of an electric motor is disclosed in the accompanying drawings in which:

Fig. 5 is a transverse section taken along the line 5—5 of Fig. 2;

Fig. 6 is a transverse section taken along the line 6—6 of Fig. 2;

Fig. 7 is a section taken along the line 7—7 of Fig. 5; and

Fig. 8 is a diagrammatic representation of the electrical connections for the controlling motor.

Figure 1:
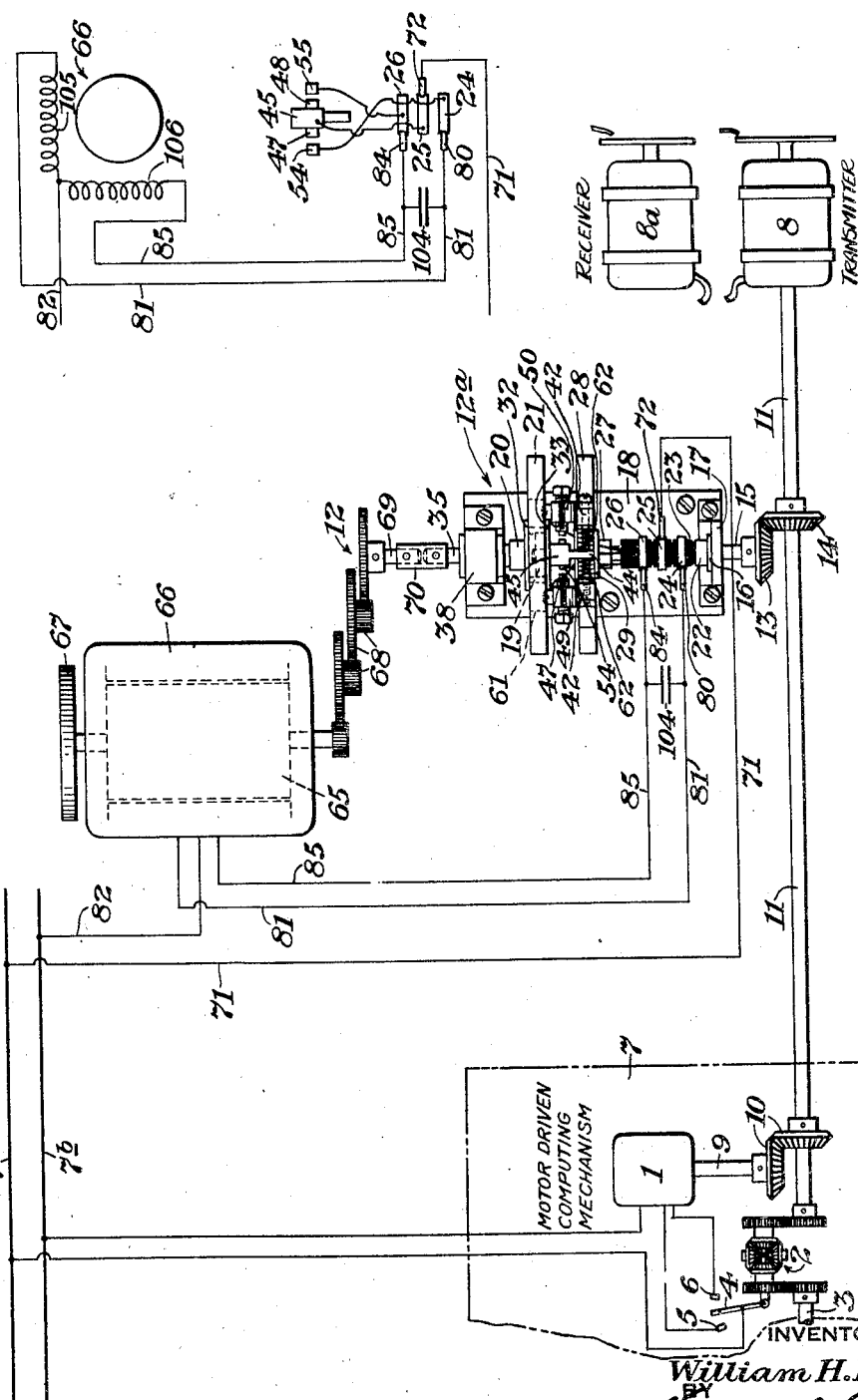
Fig. 1 is a partially diagrammatic illustration of the system.

In the drawings, a follow-up motor is indicated by the numeral 1. This follow-up motor is operated through a differential 2 to one side of which the motor is connected and to the other side of which the shaft 3 of a calculating mechanism 7 is connected. The center of the differential operates a movable contact 4 that cooperates with stationary contacts 5 and 6 for controlling the operation of the motor 1. The motor 1 is supplied with electrical energy from line wires 7a and 7b and it is connected to operate a transmitter 8 and electrical transmission system which includes a receiver 8a connected thereto by the usual well known wire connections (not shown). The shaft 9 of the motor 1 is connected through bevel gears 10 to a shaft 11 that is connected at one end to the transmitter 8 and at the other end to one side of the differential 2. Due to the fluctuations or jerky movement of the calculating mechanism shaft 3, the motor 1 is variably energized and may operate with a fluctuating rate of change of speed and at times may tend to actuate the transmitter 8 at a rate of change of speed above a desirable maximum. To avoid this condition, a regulating control mechanism 12 is connected through a shaft 15 and bevel gears 13 and 14 to the shaft 11.

The shaft 15 is journaled at one end in a ball bearing 16 mounted in a bracket 17 that is secured to a base plate 18. The opposite end of shaft 15 is journaled in a ball bearing 19 that is mounted in a recess in a hub 20 of a disk 21 of insulating material. Just above the ball bearing 16 a collar 22 is pinned to the shaft 15, and telescoped over this shaft immediately above the collar 22 is a sleeve 23 of insulating material. Metallic slip rings 24, 25 and 26 are fixedly mounted on the insulating sleeve 23 reference to which will be made subsequently. A little higher on the shaft 15 is pinned the metallic hub 27 of a disk 28 also of insulating material. The hub 27 is provided with a circular flange 29 that is deprived of a segmental portion. This flange lies against the outer face of insulating disk 28, the hub extending with slightly reduced diameter through a central hole in the disk to the opposite side thereof and through a central hole in a washer 30 that lies against the inner side of disk 28. A plurality of rivets 31 pass through the hub flange 29, the disk 28 and the washer 30 rigidly combining these members. In a similar manner, the hub 20 is provided with a flange 32 lying against the outside of the insulating disk 21 and a washer 33 lies against the inside of this disk, rivets 34 passing through the flange 32, disk 21 and washer 33 rigidly unifying these elements. The hub 20 is pinned to a shaft 35 and has a hollow portion of increased diameter passing through a central hole in the insulating disk 21 and a corresponding hole in the washer 33. The shaft 35 is rotatively mounted in a pair of ball bearings 36 and 37 which are of the form of ball bearing 19 that is shown in Fig. 7, as is the ball bearing 16. The ball bearings 36 and 37 are mounted in a bracket 38 that is secured to the base plate 18. A short spacing sleeve 39 of insulation is mounted on the shaft 15 between the ball bearing 19 and the inner end of the hub 27.

The insulating disk 28 has a mostly circular contour, but has a relatively wide opening 40 through its periphery, this opening extending well in toward the center of the disk and being semicircular at its inner end. Notches 41 are also cut in the periphery of disk 28 on opposite sides of the opening 40 and spaced therefrom short distances, the opening 40 and notches 41 causing the disk 28 to have spaced and opposed lugs 42. Passing through a clearance hole in one of the lugs 42, across the opening 40 and being threaded into the other lug 42, is a screw 43. The screw 43 also passes freely through a hole in a relatively narrow tongue 44 of a metallic block 45, the wider portion of the block being fastened by screws to the insulating disk 21. A thin conductor terminal 46 of strip metal is interposed between the block 45 and insulating disk 21 for making an electrical connection to the block 45, as explained later. The block 45 is provided with electrical contacts 47 and 48 projecting from opposite sides of its wider portion.

Figure 3:
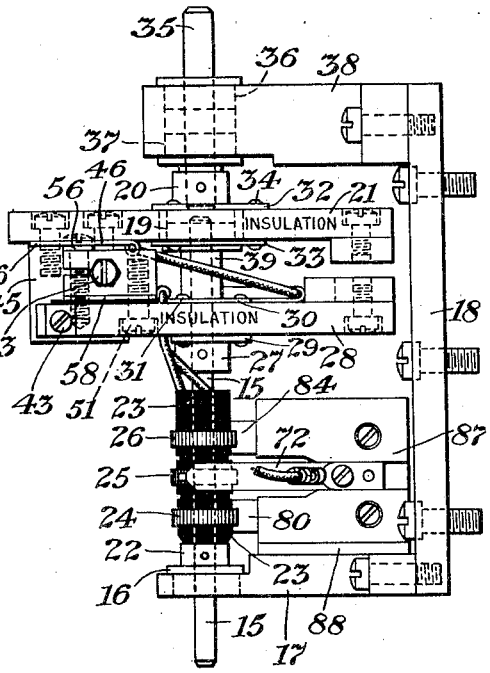
Fig. 3 is a side elevation of the same.

Spaced from and on opposite sides of the block 45 is a pair of other metallic blocks 49 and 50, each of which is secured to the other insulating disk 28 by a screw 51. Each contact block 49 and 50 is provided with a threaded hole into which holes contact screws 52 and 53 are respectively adjustably screwed. Each block 49 and 50 is slit from one of its ends to the threaded hole that receives its contact screw. The inner end of screw 52 is turned down to become an electrical contact 54 that is similar to and coacts with the contact 47. Similarly, the inner end of the screw 53 is provided with a like contact formation 55 which coacts with the contact 48. Each block 49 and 50 is provided with another screw 56 lying crosswise of its contact screw 52 or 53 and which passes with clearance through one bifurcation of the contact block 49 or 50 and is screw-threaded into the other bifurcation of the same block, as best appreciated from Fig. 3. The inner end of each clamping screw 56 also passes through holes in a strip metal conductor terminal 57 or 58 and a thin insulating shield 59. The end of each screw 56 enters an unthreaded hole 60 in the disk 28 of insulation shown in Fig. 3. Entrance of the ends of the clamping screws 56 into the holes 60 in the insulating disk 28 prevents the contact blocks 49, 50, the plate-like conductor terminals 57, 58 and the anti-current-creepage shields 59 from turning about the holding screws 51 for these enumerated elements. The other disk 21 of insulation is provided with relatively large clearance holes 61 for the accommodation of the heads of screws 56 so that the two disks 21 and 28 and the elements carried by each may have ample relative rotary movement.

Such relative rotary movement of the disks 21 and 28 occurs in response either to acceleration or deceleration of the drive 9—10—11 from the mechanism 7 to the transmitter 8 and causes the compression of one of two springs 62, which surround the screw 43 that extends through the lugs 42 of the insulating disk 28. The springs 62 lie between washers 63 and 64 that are on the screw 43, the outer washers 63 lying against the inner faces of the lugs 42 of disk 28 and the inner washers 64 lying against opposite sides of the relatively thin tongue 44 of the contact block 45 that is fast on the disk 21. The springs 62 seek to hold the tongue 44 of block 45 that is fast on disk 21 midway of the opening 40 in the disk 28, but yield to the relative rotary movement of these disks. If such yielding is in response to the normal acceleration or deceleration of the drive from the mechanism 7, the springs 62 permit the contacts 47 and 54, or the contacts 48 and 55, to come into engagement, closing a subsequently traced circuit to effect the energization of a reversible A. C. motor 66 that has a rotor 65. An inertia wheel 67 is mounted on the shaft of the rotor 65 of motor 66 to affect a predetermined total inertia of these two elements.

Prior to the energization of the control motor 66, the inertia of its rotor 65 and the inertia wheel 67 is transmitted through the rotor shaft, reduction gearing 68, a shaft 69, coupling 70 to the shaft 35 of the follow-up device 12a and to the hub of disk 21, this disk itself and the contact block 45, the springs 62, disk 28, its hub 27, shaft 15 and bevel gears 13 and 14 to the shaft 11. The above referred to inertia is, therefore, loaded, when the control motor is deenergized, onto the shaft 11 of the drive from the mechanism 7 to the transmitter 8.

Figure 2:
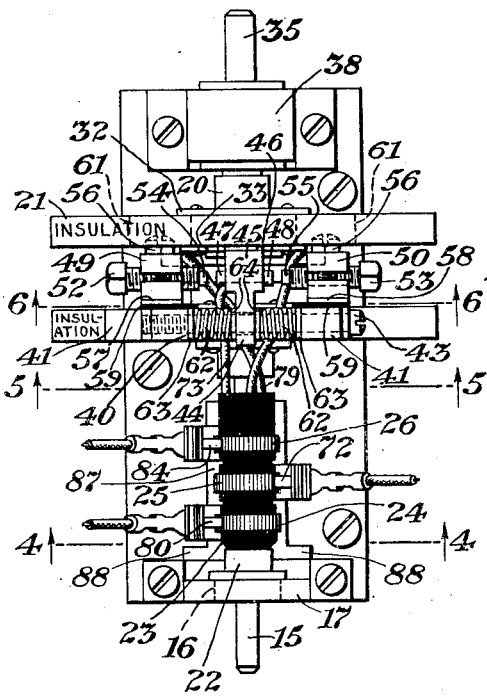
Fig. 2 is a plan of a portion of the control mechanism, more particularly the mechanism through which the energization of the controlling motor is effected.

But, upon the previously referred to engagement of, say, contacts 47 and 54, a circuit will be established from the main line 7a through a conductor 71 and brush 72 to slip ring 25. From here the circuit continues through a conductor 73 that passes through the insulating sleeve 23 and therebeyond. Reference to Fig. 5 shows that the conductor 73 extends this circuit to the tubular socket of its terminal plate 74, which lies against a rectangular terminal lug 75 of the same shape and dimensions as the body portion of the conductor terminal plate 74, except that it is thicker. Another terminal plate 76 is in the circuit and lies between the terminal lug 75 and insulating disk 28, screws 77 securing these terminal plates and lug to disk 28. A further flexible conductor 78 extends the circuit from the conductor terminal plate 76 to the other terminal plate 46 of the conductor 78, which terminal plate 46 is electrically combined with the contact block 45. The circuit continues from contact block 45 through contact 47, engaged contact 54, contact block 49, conductor terminal plate 57 and a conductor 79, which passes through the insulating sleeve 23 shown in Fig. 2 to the slip ring 24 shown in Figs. 1 and 2. The now closed circuit continues from slip ring 24 by a brush 80 and a conductor 81, shown in Fig. 1, to one winding of the stator of the A. C. motor 66 and therefrom by a conductor 82 to the other main 7b of the supply line.

The control motor 66, therefore, begins to run and neutralizes the inertia of its rotor 65 and inertia wheel 67 that was formerly loaded onto the drive 9—10—11 from the mechanism 7 to the transmitter 8. Accordingly, this drive is relieved of the restraint formerly imposed upon it by the inertia of the rotor 65 and inertia wheel 67, and the transmitter is freely operable within the limit of its permissible acceleration.

If, however, oscillation of the motor 1 occurs for the reasons already given with a resultant effort of the drive 9—10—11 to accelerate the transmitter 8 beyond its maximum permissible rate, the same circuit closure and energization of the control motor 66 takes place, but with a different result. The control motor 66 is designed to develop only a certain maximum torque, which bears a definite predetermined relationship to the torque of the motor 1 and the inertia of the combined control motor rotor 65 and inertia wheel 67 to establish the maximum permissible acceleration for the transmitter 8. Therefore, as the effort of the drive 9—10—11 to accelerate the transmitter 8 beyond its maximum permissible acceleration occurs, the drive 9—10—11 acts through bevel gears 14, 13, shaft 15, and the mechanical connection therefrom through follow-up 12a and gearing 68 to the control motor rotor 65 and inertia 67 to seek to actuate the latter at a higher speed. But, this it cannot do because the control motor 66 is energized and is designed, as stated, to develop a certain torque that limits the acceleration of its rotor 65 and the inertia wheel 67 in accordance with the maximum permissible acceleration of the transmitter 8. Consequently, the inertia of the control motor 66 and inertia wheel 67, not overcome by the motor 66, will be transmitted through gearing 68 and the follow-up 12a, mechanically through the closed switch contacts of the latter, shaft 15, and bevel gears 13, 14 to shaft 11 of the drive 9—10—11 to the transmitter 8, temporarily loading this drive with the excess inertia. Thus, the transmitter 8 is restrained from exceeding its maximum permissible acceleration at any time when the acceleration of the motor 1 tends to cause the transmitter to exceed this maximum permissible limit.

When such unduly excessive driving effort of the motor 1 to the transmitter subsides and the normal conditions are resumed, the control motor 66 is still energized, but operates as first described to remove the inertia from the drive to the transmitter, which then again freely operates within the limit of its maximum permissible acceleration. Therefore, it does this at all times.

If the motor 1 operates the shaft 11 in the opposite direction, the contacts 48 and 55 will become engaged under either the normal or abnormal conditions set forth above. Current will then come as before to the slip ring 25 and contact block 45 that is fast on disk 21. It will continue to go by now engaged contacts 48 and 55, contact block 50, the flat conductor terminal 58 and a conductor 83 to the slip ring 26. From here the circuit proceeds by a brush 84 and a conductor 85 to another winding of the motor 66, and therefrom by the conductor 82 to the opposite side 7b of the current supply line. The apparatus will then act as before, but in the opposite direction.

Each of the disks 21 and 28 is provided with a counterweight 86 to maintain it and the parts it carries in balance.

Figure 4:
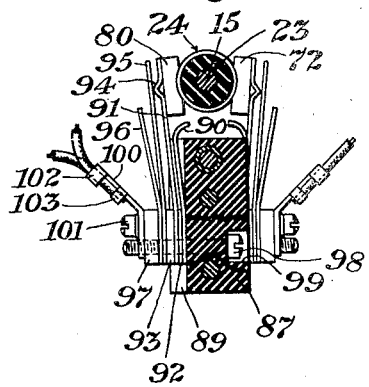
Fig. 4 is a transverse section taken along the line 4—4 of Fig. 2.

While the mounting of the brushes for the slip rings is unimportant to the present invention, it is illustrated in Fig. 4 to avoid misunderstanding of any part of the disclosure in the other views. The brushes are mounted in identically the same way, and, therefore, a description of the mounting for one will suffice for all of them. All of the brushes are mounted on an insulating block 87 provided at one end with flanges 88, the flanged end of the block being mounted by screws on the bracket 17. A groove 89 is provided in the body of the insulating block 87 for each brush assembly. In each assembly a relatively stiff inner guard 90 of thin flat metal has a portion thereof lying against the depressed face of the groove. The guard 90 has another portion that is inclined away from the depressed face of the groove 89 and which curves over a side of the block 87, as shown in Fig. 4. A flexible finger 91 has the brush 80 (or 72 or 84, according to which brush assembly is considered) soldered to one of its ends. At its opposite end the flat flexible brush-carrying finger 91 has a plate 92 soldered to it to space this flexible brush-carrying finger from the portion of the inner guard 90 that lies against the depressed face of the grove 89 in the insulating support block 87. Soldered to the opposite side of this end of the flexible finger 91 is another and somewhat thicker spacing plate 93. The opposite free end of the flexible finger 91 to which the brush 80 is affixed is provided with a transverse bead 94 against which the free end of a flat spring 95 bears to thrust the brush 80 against the slip ring 24. The opposite end of the flat spring 95 lies against the spacing plate 93. An outer guard 96 of comparatively stiff strip metal has one end laid against the adjacent end of the flat spring 95, and applied to the specified end of the outer guard 96 is a terminal lug 97. A screw 98 has its head in a cylindrical recess 99 in the support block 87 of insulation and passes through a hole in it and holes in the inner guard 90, spacing plate 92, flexible brush-carrying finger 91, spacing plate 93, flat spring 95 and outer guard 96 and is threaded through the terminal lug 97, binding these members together and attaching them to the insulating suport block 87. A terminal clip 100 is affixed to the terminal lug 97 by a screw 101. The conductor 81 for this brush assembly is attached to the terminal clip 100 by bending the ears 102 and 103 around the bared end of the conductor.

A condenser 104 is connected across the conductors 81 and 85 to enable the motor to run in one direction or in the reverse direction, as previously stated. Thus, for example, if the switch contacts 47 and 54 are engaged current may be regarded as flowing from conductor 71, as shown in Fig. 8, to slip ring 25 and therefrom to contact block 45, through the engaged contacts 47, 54 to slip ring 24 and by conductor 81 to the motor winding 105 and to the other side of the line by conductor 82. The condenser 104 establishes a path for the current over conductor 85 to the other winding 106, effecting a change of 90° in the phase relation of the windings 105 and 106, whereby the control motor 66 runs in one direction. When, on the other hand, the switch contacts 48 and 55 become engaged, current flows from contact block 45, the contacts 48, 55 to slip ring 26 and by conductor 85 to the motor winding 106 and to the line by conductor 82. The condenser 104 now establishes a current path to the conductor 81 and therefrom to the motor winding 105 and by conductor 82 to line. This causes a change in the phase relation of motor windings 105 and 106 of 90° in the opposite direction in consequence of which the motor 66 now runs in the opposite direction. This explains the control of motor 66 previously referred to in a more general way. It is obvious that various changes may be made by those skilled in the art in the details of the embodiment of the invention illustrated in the drawings and described in detail above within the principle and scope of the invention as expressed in the appended claims.

I claim:
1. In a mechanism of the type described, the combination comprising a prime mover arranged to exert a variable torque effort, and means for controlling the rate of change of speed of the prime mover including inertia means for loading the prime mover, and means for relieving the prime mover of said inertia means below a predetermined rate of change of speed of the prime mover.

2. In a mechanism of the type described, the combination comprising a prime mover arranged to exert a variable torque effort, and means for controlling the rate of change of speed of the prime mover including inertia means for loading the prime mover, and means for relieving the prime mover of said inertia means below a predetermined rate of change of speed of the prime mover including another prime mover.

3. In a mechanism of the type described, the combination comprising a prime mover arranged to exert a variable torque effort, and means for controlling the rate of change of speed of the prime mover including inertia means for loading the prime mover, and means for relieving the prime mover of said inertia means below a predetermined rate of change of speed of the prime mover including another prime mover of substantially greater capacity than said first mentioned prime mover.

4. In a mechanism of the type described, the combination comprising an electric motor arranged to exert a variable torque effort, and means for controlling the rate of change of speed of the electric motor including inertia means for loading the motor, and another electric motor for relieving the first mentioned electric motor of said loading inertia below a predetermined rate of change of speed thereof.

5. In a mechanism of the type described, the combination comprising an electric motor arranged to exert a variable torque effort, and means for controlling the rate of change of speed of the electric motor including inertia means for loading the motor, and another electric motor for relieving the first mentioned electric motor of said loading inertia below a predetermined rate of change of speed thereof, said second mentioned motor being of substantially greater capacity than said first mentioned motor.

6. In apparatus having controlled acceleration, an operable element, operating means therefor having a predetermined maximum torque and capable of a variable accelerating effort, a power device having inertia and a greater predetermined torque, and controlling means for said power device, said device and controlling means being connected to said operating means, the torques of said operating means and power device and the inertia of the latter being sufficient to restrict the operation of said operating means and element to a predetermined maximum acceleration.

7. In apparatus having controlled acceleration, an operable element, operating means therefor having a predetermined maximum torque and capable of a variable accelerating effort, a power device having inertia and a greater predetermined torque, governing means controlling said power device, and actuating means for said governing means operable by said operating means, said power device being connected to said operating means, the torques of said operating means and power device and the inertia of the latter being sufficient to restrict the operation of said element to a predetermined maximum acceleration.

8. In apparatus having controlled acceleration, mechanism including a motor having a predetermined torque and capable of a variable accelerating effort, an operable element, an operating connection from said motor to said element, a second motor having a predetermined torque much greater than that of the motor of said mechanism and also a rotor having predetermined inertia, and an electric switch in circuit with said second motor, said switch and second motor being operatively connected to said operating connection, the torques of said motors and the inertia of the second motor being of a value to restrict the operation of said element to a predetermined maximum acceleration.

9. In apparatus having controlled acceleration, mechanism including a motor having a predetermined torque and capable of variable accelerating effort, an operable element, an operating connection from said motor to said element, a second motor having a predetermined torque much greater than that of the motor of said mechanism and also a rotor having predetermined inertia, an electric switch device in circuit with said second motor comprising relatively rotatable members and coacting contacts mounted thereon, and operative connections between said operating connection and one of said members and between another of said members and the rotor of the second motor, normal acceleration of the first named motor engaging said contacts to energize the second motor to relieve said operating connection of the inertia of said rotor and excessive accelerating effort of the first named motor being restrained by the inertia of said rotor of the second motor to restrict the operation of said element to a predetermined maximum acceleration.

10. In apparatus having controlled acceleration, mechanism including a motor having a predetermined torque and capable of a variable accelerating effort, an operable element, an operating connection from said motor to said element, a second motor having a predetermined torque much greater than that of the motor of said mechanism and also a rotor having predetermined inertia, an electric switch device in circuit with said second motor comprising relatively rotatable members, coacting contacts mounted thereon and yielding means tending to separate said contacts, and operative connections between said operating connection and one of said members and between another of said members and the rotor of said second motor, normal and excessive accelerating efforts of the first named motor closing coacting contacts and respectively removing and imposing the inertia of said motor of the second motor from and on said operating connection thereby restricting said element to a predetermined maximum acceleration.

11. In apparatus having controlled acceleration, an operating motor, an element controlled thereby, a control motor having a predetermined torque materially greater than that of said operating motor, and controlling means between said control motor and said operating motor and element controlling the control motor to cause it to control the acceleration of said operating motor and element.

12. In apparatus having controlled acceleration, an operating motor, operable means controlled thereby, and controlling mechanism comprising a control motor having a predetermined torque materially greater than that of said operating motor and a predetermined inertia, an electric switch having relatively rotatable members, coacting contacts carried by the different members and yielding means acting on said members to normally separate said contacts, electrical connections between said contacts and control motor and a source of current supply, and a mechanical connection between said control motor and operating motor and operable means including said rotatable members and contacts, normal and excessive acceleration efforts of said operating motor effecting energization of said control motor to respectively remove and apply its inertia from and to said operating motor and operable means to restrict their operation to a predetermined maximum acceleration.

13. In apparatus having controlled acceleration, an operating motor, operable means controlled thereby, and controlling mechanism comprising a control motor having a predetermined torque materially greater than that of said operating motor and a predetermined inertia, an electric switch having relatively rotatable members, coacting contacts carried by the different members, yielding means acting on said members to normally separate said contacts and slip rings rotatable with one of said members, electrical connections between said contacts and slip rings and the latter and said control motor and a source of current supply, and a mechanical connection between said control motor and operating motor and operable means including said rotatable members and contacts, normal and excessive acceleration efforts of said operating motor effecting energization of said control motor to respectively remove and apply its inertia from and to said operating motor and operable means to restrict their operation to a preedtermined maximum acceleration.

14. In apparatus having controlled acceleration, a reversibly operable driving motor, operable means driven thereby, and controlling mechanism comprising a reversibly operable control motor having a predetermined torque materially greater than that of said driving motor and a predetermined inertia, an electric switch having alternative positions of closure, selective circuits connecting said switch and control motor for reversible operation of the latter, and a mechanical connection between said control motor and said driving motor and operable means, normal and excessive accelerations of said driving motor effecting energization of said control motor to respectively remove and apply its inertia from and to said driving motor and operable means to restrict their operation to a predetermined maximum acceleration.

15. In apparatus having controlled acceleration, a driven member, operating means therefor capable of variable accelerating effort, a power device having predetermined torque and inertia, and a control device for controlling the operation of said power device and operable by the accelerating effort of said operating means, said control device including means effective upon initial acceleration of said operating means for applying the inertia of said power device to said operating means, means responsive upon attainment of normal acceleration by said operating means for removing the inertia from the operating means, and means effective upon excessive acceleration of said operating means to render the torque of said power means effective to prevent excessive acceleration of said element.

16. Mechanism of the type described, comprising input means, a variable torque first prime mover controlled by said input means, an instrumentality connected to said prime mover to be driven thereby, inertia means including a second prime mover effectively connectible to said first prime mover to load the latter, and acceleration responsive means to energize said second prime mover when the acceleration of said first prime mover exceeds a predetermined value.

17. The combination with input means and a first prime mover capable of exerting variable torque controlled by said input means, of inertia means including a second prime mover effectively connectible to said first prime mover to load the latter, and acceleration responsive means operable to energize said second prime mover when the acceleration of said first prime mover exceeds a predetermined magnitude.

18. The combination with input means and a variable torque first prime mover controlled by said input means, of acceleration responsive inertia mechanism including a second prime mover and a control therefor operable to limit the acceleration of said first prime mover.

WILLIAM H. NEWELL.